(12) United States Patent
Wu et al.

(10) Patent No.: US 12,518,507 B2
(45) Date of Patent: Jan. 6, 2026

(54) COMPOSITIONAL ACTION MACHINE LEARNING MECHANISMS

(71) Applicant: International Business Machines Corporation, Armonk, NY (US)

(72) Inventors: Bo Wu, Cambridge, MA (US); Chuang Gan, Cambridge, MA (US); Pin-Yu Chen, White Plains, NY (US); Xin Zhang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 17/737,535

(22) Filed: May 5, 2022

(65) Prior Publication Data

US 2023/0360364 A1 Nov. 9, 2023

(51) Int. Cl.
*G06V 10/764* (2022.01)
*G06V 10/774* (2022.01)
*G06V 10/80* (2022.01)

(52) U.S. Cl.
CPC ........ *G06V 10/764* (2022.01); *G06V 10/7753* (2022.01); *G06V 10/806* (2022.01)

(58) Field of Classification Search
None
See application file for complete search history.

(56) References Cited

U.S. PATENT DOCUMENTS 8,094,881 B2 * 1/2012 Matsugu ................ G06V 40/10
348/169

10,242,266 B2 * 3/2019 Jones ...................... G06N 3/08
11,270,147 B1 * 3/2022 Jagannathan ........ G06V 10/255
(Continued)

FOREIGN PATENT DOCUMENTS

CN 109816109 A 5/2019
CN 111401205 A 7/2020
(Continued)

OTHER PUBLICATIONS

TH Kober, "Inferring Unobserved Co-Occurrence Events in Anchored Packed Trees," PhD Thesis, University of Sussex, Nov. 2017 (Year: 2017).*

(Continued)

*Primary Examiner* — Soo Shin
(74) *Attorney, Agent, or Firm* — CHIP LAW GROUP

(57) ABSTRACT

Mechanisms are provided for performing machine learning (ML) training of a ML action recognition computer model which involves processing an original input dataset to generate an object feature bank comprising object feature data structures for a plurality of different objects. For an input video, a verb data structure and an original object data structure are generated and a candidate object feature data structure is selected from the object feature bank for generation of pseudo composition (PC) training data. The PC training data is generated based on the selected candidate object feature data structure and comprises a combination of the verb data structure and the candidate object feature data structure. The PC training data represents a combination of an action and an object not represented in the original input dataset. ML training of the ML action recognition computer model is performed based on an unseen combination comprising the PC training data.

18 Claims, 4 Drawing Sheets

(56) References Cited

U.S. PATENT DOCUMENTS

| | | | |
|---|---|---|---|
| 2021/0049351 A1* | 2/2021 | Hosoi | G06F 18/28 |
| 2022/0076003 A1 | 3/2022 | Neo et al. | |
| 2024/0419382 A1* | 12/2024 | Dekel | G06V 20/70 |

FOREIGN PATENT DOCUMENTS

| | | |
|---|---|---|
| CN | 111523477 A | 8/2020 |
| CN | 112847336 A | 5/2021 |

OTHER PUBLICATIONS

Soomro et al., "UCF101: A Dataset of 101 Human Actions Classes From Videos in The Wild," arXiv:1212.0402v1 [cs. CV] Dec. 3, 2012 (Year: 2012).*

Materzynska et al., "Something-Else: Compositional Action Recognition with Spatial-Temporal Interaction Networks," arXiv:1912.09930v3 [cs.CV] Sep. 12, 2020 (Year: 2020).*

Arnab, Anurag et al., "ViViT: A Video Vision Transformer", arXiv:2103.15691v2 [cs.CV], Nov. 1, 2021, 14 pages.

Baradel, Fabien et al., "Object Level Visual Reasoning in Videos", European Conference on Computer Vision (ECCV 2018), Sep. 8-14, 2018, 17 pages.

Biederman, Irving, "Recognition-by-Components: A Theory of Human Image Understanding", Psychological Review, vol. 94, No. 2, 115-147, Apr. 1987, 33 pages.

Carreira, Joao et al., "Quo Vadis, Action Recognition? A New Model and the Kinetics Dataset", 2017 IEEE Conference on Computer Vision and Pattern Recognition (CVPR), Jul. 2017, 10 pages.

Choi, Jinwoo et al., "Why Can't I Dance in the Mall? Learning to Mitigate Scene Bias in Action Recognition", 33rd Conference on Neural Information Processing Systems (NeurIPS 2019), arXiv:1912.05534v1 [cs.CV], Dec. 11, 2019, 13 pages.

Donahue, Jeff et al., "Long-term Recurrent Convolutional Networks for Visual Recognition and Description", Proceedings of the IEEE Conference on Computer Vision and Pattern Recognition (CVPR15), Jun. 7-12, 2015, 10 pages.

Feichtenhofer, Christoph et al., "SlowFast Networks for Video Recognition", IEEE/CVF International Conference on Computer Vision, Oct. 27-Nov. 2, 2019, 10 pages.

Girdhar, Rohit et al., "Video Action Transformer Network", IEEE/CVF Computer Vision and Pattern Recognition (CVPR 2019), Jun. 16-20, 2019, 10 pages.

Goyal, Raghav et al., "The "something something" video database for learning and evaluation visual common sense", Proceedings of the IEEE International Conference on Computer Vision (ICCV), Oct. 22-29, 2017, 9 pages.

He, Kaiming et al., "Mask R-CNN", Proceedings of the IEEE International Conference on Computer Vision (ICCV), Oct. 22-29, 2017, 9 pages.

Herzig, Roei et al., "Spatio-Temporal Action Graph Networks", IEEE/CVF International Conference on Computer Vision Workshops (ICCVW), Oct. 27-28, 2019, 10 pages.

Hou, Zhi et al., "Detecting Human-Object Interaction via Fabricated Compositional Learning", Proceedings of the IEEE/CVF International Conference on Computer Vision and Pattern Recognition (CVPR), Jun. 20-25, 2021, 10 pages.

Huynh, Dat et al., "Compositional Zero-Shot Learning via Fine-Grained Dense Feature Composition", 34th Conference on Neural Information Processing Systems (NeurIPS 2020), Dec. 6-12, 2020, 12 pages.

Ji, Shuiwang et al., "3D Convolutional Neural Networks for Human Action Recognition", IEEE Transactions on Pattern Analysis and Machine Intelligence, vol. 35, No. 1, Jan. 2013, 11 pages.

Kato, Keizo et al., "Compositional Learning for Human Object Interaction", European Conference on Computer Vision (ECCV), Sep. 8-14, 2018, 18 pages.

Kay, Will et al., "The Kinetics Human Action Video Dataset", arXiv:1705.06950v1 [cs.CV], May 19, 2017, 22 pages.

Kim, Dong-Jin et al., "Detecting Human-Object Interactions with Action Co-occurrence Priors", European Conference on Computer Vision (ECCV), Aug. 23-28, 2020, 18 pages.

Kim, Tae S. et al., "Motion Guided Attention Fusion to Recognize Interactions from Videos", IEEE/CVF International Conference on Computer Vision (ICCV), Oct. 11-17, 2021, 11 pages.

Kim, Tae S. et al., "SAFCAR: Structured Attention Fusion for Compositional Action Recognition", arXiv:2012.02109v2 [cs.CV], Dec. 17, 2020, 11 pages.

Kipf, Thomas N. et al., "Variational Graph Auto-Encoders", arXiv:1611.07308v1 [stat.ML], Nov. 21, 2016, 3 pages.

Lake, Brenden M. et al., "Building machines that learn and think like people", Behavioral and Brain Sciences (2017), vol. 40, Mar. 2017, 72 pages.

Lin, Ji et al., "TSM: Temporal Shift Module for Efficient Video Understanding" arXiv:1811.08383v3 [cs.CV], Aug. 22, 2019, 13 pages.

Liu, Ze et al., "Video Swin Transformer", arXiv:2106.13230v1 [cs.CV], Jun. 24, 2021, 12 pages.

Mancini, Massimiliano et al., "Open World Compositional Zero-Shot Learning", Proceedings of the IEEE/CVF Conference on Computer Vision and Pattern Recognition (CVPR), Jun. 20-25, 2021, 9 pages.

Materzynska, Joanna et al., "Something-Else: Compositional Action Recognition with Spatial-Temporal Interaction Networks", Proceedings of the IEEE/CVF Conference on Computer Vision and Pattern Recognition (CVPR), Jun. 13-19, 2020, 11 pages.

Neimark, Daniel et al., "Video Transformer Network", arXiv:2102.00719v3 [cs.CV], Aug. 17, 2021, 11 pages.

Pan, Pingbo et al., "Hierarchical Recurrent Neural Encoder for Video Representation with Application to Captioning", Proceedings of the IEEE Conference on Computer Vision and Pattern Recognition (CVPR), Jun. 27-30, 2016, 10 pages.

Simonyan, Karen et al., "Two-Stream Convolutional Networks for Action Recognition in Videos", arXiv:1406.2199v2 [cs.CV], Nov. 12, 2014, 11 pages.

Sun, Pengzhan et al., "Counterfactual Debiasing Inference for Compositional Action Recognition", Proceedings of the 29th ACM International Conference on Multimedia (MM '21), Oct. 20-24, 2021, 9 pages.

Tran, Du et al., "A Closer Look at Spatiotemporal Convolutions for Action Recognition", Proceedings of the IEEE Conference on Computer Vision and Pattern Recognition, Jun. 18-23, 2018, 10 pages.

Tran, Du et al., "Learning Spatiotemporal Features with 3D Convolutional Networks", Proceedings of the IEEE International Conference on Computer Vision (ICCV), Dec. 7-13, 2015, 9 pages.

Van Den Berg, Rianne et al., "Graph Convolutional Matrix Completion", arXiv:1706.02263v2 [stat.ML], Oct. 25, 2017, 9 pages.

Wang, Limin et al., "Temporal Segment Networks: Towards Good Practices for Deep Action Recognition", The 14th European Conference on Computer Vision (ECCV), Oct. 8-16, 2016, 16 pages.

Yan, Rui et al., "Interactive Fusion of Multi-level Features for Compositional Activity Recognition", arXiv:2012.05689v1 [cs.CV], Dec. 10, 2020, 10 pages.

\* cited by examiner

COMPOSITIONAL ACTION MACHINE LEARNING MECHANISMS

BACKGROUND

The present application relates generally to an improved computing tool and improved computing tool operations, and more specifically to improved computing tools and improved computing tool operations that perform compositional action machine learning.

Artificial intelligence (AI) increasingly utilizes machine learning computer models to model various real-world mechanisms, such as biological mechanisms, physics based mechanisms, business and commercial mechanisms, and the like, typically for classification and/or predictive purposes. Such machine learning (ML) computer models include linear regression models, logistic regression, linear discriminant analysis, decision trees, naïve Bayes, K-nearest neighbors, learning vector quantization, support vector machines, random forest, and deep neural networks.

One field where AI and ML computer models have been implemented is the area of image recognition. Image recognition is the ability for a computing device to be able to identify objects and actions in image data, such as from digital video content, still image data, or the like. As part of image recognition by computing devices, in order to identify actions being performed in digital video and/or digital image data some AI and ML computer models have implemented compositional action recognition which identifies the actions that interact with objects. In order to train ML computer models to identify such interactions and thus, classify the actions being performed in the input digital video/image data, the ML computer models are trained on known training video/image data comprising actions performed on objects.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method for performing machine learning training of a machine learning (ML) action recognition computer model executing in at least one computing device is provided. The method comprises processing an original input dataset, comprising a plurality data structures each representing a corresponding video sequence, to generate an object feature bank comprising object feature data structures for a plurality of different objects. The method further comprises generating, for a video sequence in the original input dataset, a verb data structure and an original object data structure. The method also comprises selecting, from the object feature bank, a candidate object feature data structure for generation of pseudo composition training data. In addition, the method comprises generating the pseudo composition training data based on the selected candidate object feature data structure. The pseudo composition training data comprises a combination of the verb data structure and the candidate object feature data structure. The pseudo composition training data represents a combination of an action and an object not represented in the original input dataset. Furthermore, the method comprises performing a machine learning training operation on the ML action recognition computer model based on both seen combinations comprising the verb data structure combined with the original object data structure, and an unseen combination comprising the pseudo composition training data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
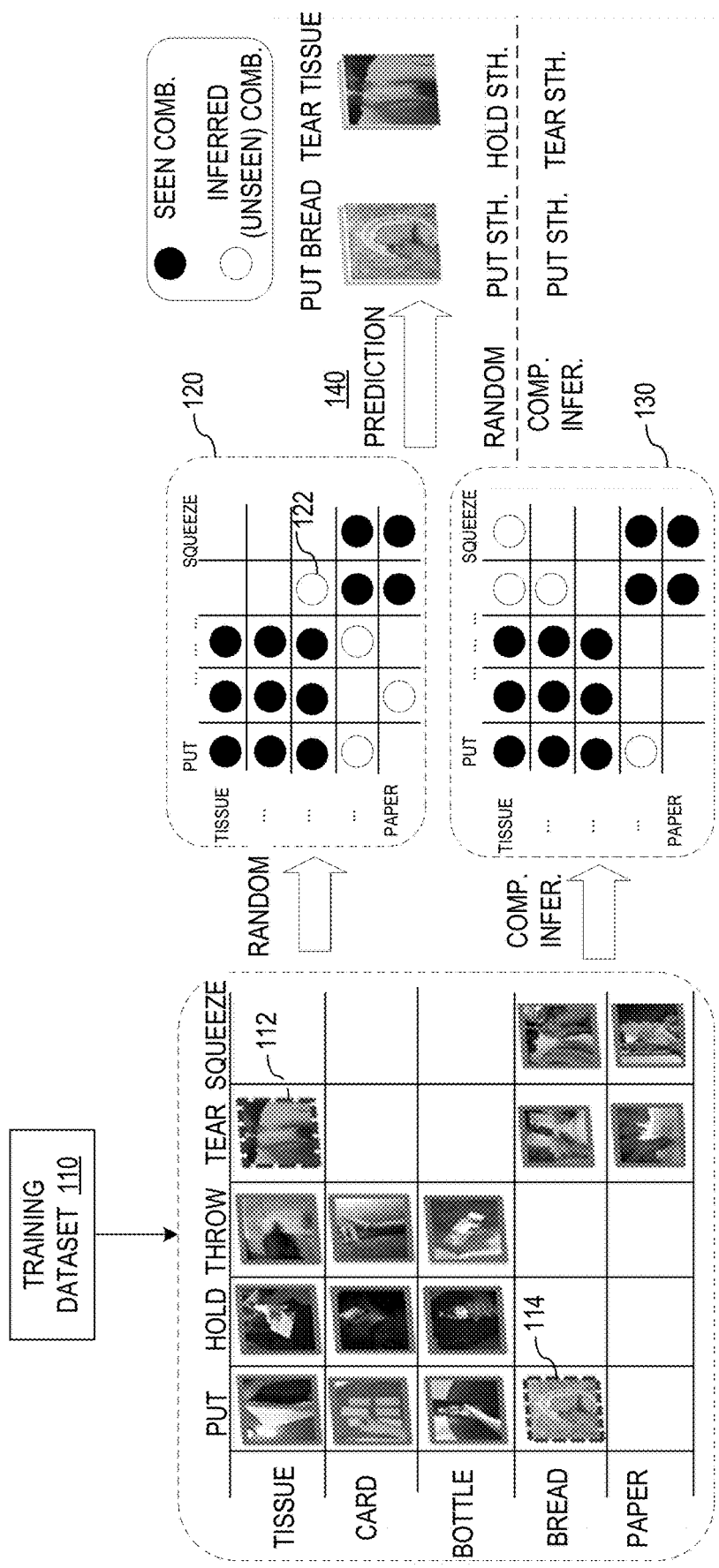
FIG. 1 is an example diagram illustrating the generation of an estimated co-occurrence matrix C' for action (verb) and object (noun) combinations in accordance with one illustrative embodiment.

Artificial intelligence (AI), and machine learning (ML) computer models used to implement AI solutions, provide useful advances to solving complex problems and modeling real-world mechanisms and processes. However, the generation, training, and testing of such ML computer models, such that ML computer models are provided that consistently generate accurate results, is a very labor, time, and resource intensive process that often requires a large amount of experimentation and a large amount of training data in order to ensure that the trained ML computer model can be generalized to as many situations as possible. This labor, time, and resource cost is even greater when the mechanisms and processes, that the AI and ML computer model tools are used to model, are largely variable and not as predictable, such as in the case of image recognition, and specifically action classification using compositional action recognition in digital video/image data.

It is very costly to generate large, labeled training datasets for ML action recognition computer models as it requires not only the obtaining of a large amount of video/image data, i.e., a large set of samples, but then also a large amount of human effort and time to review the samples and manually assign labels to the samples in this training data. Moreover, this process allows for the introduction of human error in the labeling of this training data. As a result, existing ML action recognition computer models are trained on training datasets that are not comprehensive of the objects/actions compositions that the ML action recognition computer models will encounter during runtime operation after training and testing, i.e., during inference operations. These ML action recognition computer models, while working well for objects/actions that closely resemble the objects/actions seen in the training data, do not work well for object/action compositions that are unseen in the training data, i.e., the ML action recognition computer models are not able to be generalized to unseen situations where "unseen" refers to object/action combinations that were not explicitly represented in the training data used to train the ML action recognition computer model. Thus, there is a need for an improved computing tool and improved computing tool operation that specifically provides an improvement to the functionality of ML action recognition computer models to make them generalizable to unseen object/action combinations while providing accurate results. Moreover, there is a need to provide a computing tool and computing tool operations that improve the machine learning training operations, and to generate improved training data, used to perform machine learning training of ML action recognition computer models, and train the ML action recognition computer models on this improved training data so that they can be generalized to object/action compositions that are not represented in the original given labeled training dataset.

The illustrative embodiments provide an improved computing tool and improved computing tool operations that leverage the composition property between objects and actions and utilize this composition property to learn, through machine learning processes, an improved action recognition ability on compositional actions, i.e., actions being performed with regard to an object, in digital video/image data, such as, for example, actions performed by a human hand on various objects manipulatable by a human hand (this is only a non-limiting example and one of ordinary skill in the art will recognize that present invention is applicable to any action/object compositions without departing from the spirit and scope of the present invention). The illustrative embodiments provide improved computing tool and improved computing tool operations that operate to provide a novel machine learning training framework, referred to herein as the Pseudo Composition Inference (PCI) framework, which itself operates to construct pseudo compositions through recombination of the visual representations of motions (actions) and objects detected in the original given training data, i.e., labeled training dataset(s) comprising video/image data showing compositions of actions/objects. The detected actions and objects in the labeled training dataset(s) are separated and then combined in new combinations, not present in the original given training data, so that new combinations of actions/objects may be represented in the training data. Subsequently, these pseudo compositions are input into the ML action recognition computing model, referred to herein as the action classifier, guiding the machine learning training of the action classifier so that it learns action classifications from these novel compositions of actions/objects. Extensive experiments demonstrate that this improved computing tool and improved computing tool operation results in trained action classifiers that outperform existing ML computer models on the compositional action setting.

The illustrative embodiments operate on the concept that if the ML computer models, trained to be action classifiers, are able to experience appropriate cases with novel compositions of actions/objects during the machine learning training process, these ML computer models will have better performance when presented with novel compositions, such as during runtime or inference time. For example, assume that there are video/image data instances in a training dataset that comprises an action space with action verbs (classifications) and nouns (objects), where the action verbs include the action verb "tear" and there are a plurality of nouns, or objects, including leaves, phone, biscuit, cloth, carrot, and card, i.e., there is video/image data representing a composition of "tear leaves", "tear biscuit", "tear cloth", "tear carrot", "tear card", and "tear phone". A ML computer model and ML mechanisms may be configured to train the ML computer model to learn from the compositions of an original given labeled training dataset. In such a case, the ML computer model can only know the action verb (action classification) "tear" is relevant to the objects specifically represented in the compositions of "tear" in the training dataset. This is because the ML computer model cannot distinguish the content of the video/image data that is specific to the action and the content that is specific to the object, i.e., the ML computer model operates on the entirety of the features of the input video/image data. Thus, the ML computer model may not be able to accurately perform action-object recognition operations with regard to new or novel action-object combinations, e.g., a video/image representing the action-object of [tear paper]. Thus, when presented with such a video/image, the ML computer model will generate an inaccurate result, e.g., [tear cloth].

As the number of instances of compositions of the action verb with objects increase in the training dataset, the ML computer model is trained to more easily and accurately, i.e., with a higher confidence action classification, utilize the common components of the instances to recognize the action verb "tear" with data patterns representing objects or portions of objects. Therefore, the inference on novel compositions not present in the training dataset, such as a video/image representing [tear paper] in the depicted example, will be more confident.

However, as noted above, having large training datasets that have been accurately labeled is not feasible due to the costs involved in generating such large labeled training datasets and the vast number of possible action/object combinations possible. As a result, ML action recognition computer models are limited in the action/object combinations that they can accurately recognize leading to very limited use of the ML action recognition computer models or leading to inaccurate results of the ML action recognition computer models when they are presented with novel action/object combinations that were not previously seen in the training dataset used to train the ML action recognition computer models.

To empower the ML action recognition computer model of an image recognition computing system with the ability to learn, through machine learning processes, more accurate action representations for unseen action-object interactions (or compositions), i.e., action-object compositions not represented in the video/image data instances of the original given labeled training dataset, the illustrative embodiments provide an improved computing tool and improved computing tool operations that explicitly construct digital unseen compositions called "pseudo compositions" to increase the diversity of the visual representations of actions with various objects, and thereby expand and improve the training dataset which is used to train the action classifier(s) of the ML action recognition computer model. The pseudo compositions are able to provide more complementary information about unseen objects for action verbs (action classifications of an action classifier), and thereby expand the possible combinations of a given action verb with various objects that may appear in newly received video/image data content.

To generate these pseudo compositions, the improved computing tool and improved computing tool operations perform functions to implement a methodology referred to herein as Pseudo Composition Inference (PCI). PCI generates visual representations of the unseen compositions of actions/objects by fixing the visual embedding of actions but replacing the original visual embedding of objects with new embeddings of objects, thereby generating synthetic, or pseudo, compositions of actions and objects that were not originally present in the original given labeled training dataset, e.g., the training dataset may have instances of "tear" with various objects, but not with paper, and PCI can generate a new instance with a composition of, and embedding for, the action of "tear" and an embedding representing an object that is "paper".

Performing machine learning training of a ML action recognition computer model with such visual embedding combinations, i.e., pseudo compositions, increases the anti-disturbance of the ML action recognition computer model and guides the ML action recognition computer model to capture the inherent semantics of action verbs instead of irrelevant context. To obtain reasonable diversity of new compositions, while taking into account the reasonableness of the compositions, the PCI operation is performed over co-occurrences which generate close relevant novel compositions from seen compositions, i.e., compositions present in the original given labeled training dataset. That is, composition inference provides more reasonable action/object correlation on new composition candidates. The action classifier(s) of the ML action recognition computer model utilize the supervisions of all candidates to grasp the ability of compositional action recognition.

In accordance with one illustrative embodiment, the improved computing tool and improved computing tool operations of the illustrative embodiment provide multiple machine learning models, e.g., convolutional neural network (CNN), deep learning neural network (DNN), or the like, that operate on input video/image datasets to perform object identification and generate temporal and spatial representations from artificial intelligence analysis of the input video/image datasets. The PCI framework comprises a PCI network (PCInet) in which a first pipeline operates on the input video/image dataset to generate a set of action verbs ($X_v$) associated with the object identified in the input video/image data. A second pipeline operates on the input video/image data (hereafter referred to collectively as image data, where it is appreciated that video data is comprised of a time sequence of individual images), in association with the first pipeline, to identify nouns ($X_n$), e.g., objects, present in the input image data. In addition, a separate object feature bank $O_s$ is provided which stores object feature representations that may be used to generate pseudo compositions with the actions (verbs) Xv in an input video so as to expand the training dataset.

The separately identified actions (verbs) Xv and objects (nouns) $X_n$ may be input to an action classifier, e.g., a machine learning action recognition model, to thereby train the machine learning action recognition model to recognize, or properly classify, actions (verbs) associated with objects in the input video content, e.g., in the training dataset. In accordance with the illustrative embodiments, the objects $X_n$ may also be combined with object features sampled from the object feature bank $O_s$ to generate pseudo compositions that expand the combinations of action (verb) features $X_v$ with pseudo object features ($X_n'$), and thereby increase the range of objects for which the corresponding action (verb) may be properly identified by the trained machine learning action recognition model.

In one illustrative embodiment, mechanisms are provided for performing machine learning training of a machine learning (ML) action recognition computer model executing in at least one computing device. The mechanisms process an original input dataset, comprising a plurality data structures each representing a corresponding video sequence, to generate an object feature bank comprising object feature data structures for a plurality of different objects. The mechanisms generate, for a video sequence in the original input dataset, a verb data structure and an original object data structure. The mechanisms select, from the object feature bank, a candidate object feature data structure for generation of pseudo composition training data. In addition, the mechanisms generate the pseudo composition training data based on the selected candidate object feature data structure. The pseudo composition training data comprises a combination of the verb data structure and the candidate object feature data structure. The pseudo composition training data represents a combination of an action and an object not represented in the original input dataset. Furthermore, the mechanisms perform a machine learning training operation on the ML action recognition computer model based on both seen combinations comprising the verb data structure combined with the original object data structure, and an unseen combination comprising the pseudo composition training data.

Experiments have shown that the mechanisms of the illustrative embodiments achieve approximately 70% and 90% on top-1 and top-5 accuracy, respectively. The results of ablation case studies also confirm that inferred pseudo compositions improve the action recognition capability, especially for the actions with rare compositions.

Thus, the illustrative embodiments provide a specific improved computer tool and computer tool operations that are specifically directed to improving the way that existing art in machine learning trained action recognition models and action classifiers are trained and operate to infer action verbs from input video/image data. The improved computing tool and improved computing tool operations incorporate complementary information about unseen objects by incorporating unseen pseudo compositions into action recognition machine learning. The illustrative embodiments implement a Pseudo Composition Inference (PCI) framework which performs a PCI methodology and operations for compositional action recognition. This PCI framework can infer the reasonable unseen compositions and effectively utilize the pseudo compositions to improve recognition for action verbs with different objects.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an improved machine learning computer tool, in the form of a pseudo composition inference (PCI) network (PCINet) framework, that improves the machine learning training of a machine learning action recognition computer model or action classifier. The improved computing tool implements mechanism and functionality, such as the PCINet elements described hereafter, including multiple machine learning computer models, which operate to train, through machine learning processes, a machine learning action recognition computer model (action classifier). Such functionality and mechanisms cannot be practically performed or implemented by human beings either outside of, or with the assistance of, a technical environment, such as in the form of a mental process, organization of human activity, or the like. The improved computing tool provides a practical application of the methodology at least in that the improved computing tool is able to train, through machine learning processes, a machine learning action recognition computer model to improve the performance of the machine learning action recognition computer model to classify the actions present in input video/image data when presented with new or novel action-object combinations.

The illustrative embodiments are specifically directed to an improved computing tool and improved computing tool operations that are specifically designed to improve machine learning training and computer image recognition with regard to action recognition from input video/image data. Such action recognition is a significant part of modern computer vision systems. With the advent of emerging big-scale data and powerful computation mechanisms, deep learning computer tools for action recognition have become the mainstream, including two-stream convolution networks, recurrent neural networks (RNNs), 3D convolution neural networks (CNNs), and neural network based transformers for videos that transform one stream of data into a second stream of data. Due to the innate shortcomings of CNNs and transformers, these mechanisms simply memorize the action with its corresponding subject-object interaction information, meaning that the trained CNNs and transformers are limited to accurately identifying only the combinations of actions-objects that the CNNs and transformers have seen in the training data. Thus, when a previously unseen object is present in input image data, e.g., in an input video sample during runtime or inference operation, such computer models fail to give a correct prediction of the action classification.

Materzynska et al., "Something-else: Compositional action recognition with spatial-temporal interaction networks", Proceedings of the IEEE/CVF Conference on Computer Vision and Pattern Recognition, pages 1049-1059, 2020 introduced the compositional action recognition task aiming to improve action learning generality across all kinds of objects involved in videos. Another line of works focus on model architecture design for better aggregation of the features learned separately from instance coordinates and Red Green Blue (RGB) frames of videos. Still other works propose leveraging a prior causal graph structure to learn a video representation and then remove the appearance bias effect on the final classification using counterfactual inference. However, each of these works learn actions from only seen combinations, i.e., combinations given in a manually labeled training dataset, and are not trained using unseen combinations, i.e., combinations not represented in the manually labeled training dataset.

The compositional action recognition task enforces that the combination of verbs (actions) and nouns (objects) do not overlap between training and testing sets. For example, given a video X, the goal is to recognize the action category $y_v$. The term $X_v$ denotes the verb (action) representation of video X, and $X_n$ denotes the noun (object) representation of video X (which may comprise one or more actual objects depicted in the video X). Thus, if the input video X represents the tearing of a piece of paper, then $X_v$ is the term "tear" and $X_n$ is the object "paper". The action prediction p of X can be written as follows:

$$p(y_v|X)=p(y_v|X_v,X_n) \quad (1)$$

Due to the compositional setting, action recognition models tend to be confused by $X_n$ during the inference stage, especially when the object appearance changes a lot in the video X, or is significantly different from the training dataset used to train the ML action recognition computer model. That is, during the training of the action recognition models, the models "memorize" static object information, e.g., color, size, etc., and this memorization will affect the predictions generated by the action recognition models, thereby "confusing" the action recognition model. A direct way to eliminate the confusion from objects when performing action recognition is to discard the object information, i.e., discard $X_n$ of video X). However, removing the object information from the data operated on by the ML action recognition computer model makes the action representation in the ML action recognition computer model incomplete, as action knowledge is encoded into the noun representation $X_n$, e.g., the changes of the intrinsic property of objects due to the action is encoded into the noun representation.

Instead of discarding the object information, the illustrative embodiments implement inference on pseudo action-object or verb-noun compositions that the ML action recognition computer model never encountered during training, to thereby enhance its action representation and reduce the appearance bias from seen objects. That is, given the video X, a pseudo composition is constructed by generating a new noun representation $X_n'$ (such as for one or more different objects other than what is represented in the video X) and composing it with the verb representation $X_v$ of the video X, e.g., if the video X is of "tear ticket", then a new noun representation may be for "paper" and that new noun representation may be combined with the verb representation $X_v$ of "tear" from the video X to generate a new pseudo composition of "tear paper". The ML action recognition computer model is encouraged to correspond the representation of verb $X_v$ to its action label $y_v$ when inputting this pseudo composition to it, thereby biasing the ML action recognition computer model to generate the action label $y_v$ when input patterns of action-object from input videos are received that resemble the data patterns of the pseudo action-object composition $(X_v, X_n')$, e.g., even though the training data did not have images of "tear paper", through operation of the illustrative embodiments, the representation $X_v$ for the action "tear" is combined with the representation $X_n'$ for an object "paper", and then the action classifier is trained to output a predicted action $y_v$ of "tear" with regard to this pseudo action-object composition.

With regard to the pseudo composition generation, the illustrative embodiments generate one or more new representation $X_n'$ for each video sample X, and the action representation of video sample X, i.e., $X_v$, to compose the pseudo composition $(X_v, X_n')$. Given the verb representation $X_v$ from the operation of an image analysis computer model on the given video sample, such as a 3D convolutional neural network or the like, and the action label $y_v$ of video sample X, i.e., the ground truth or predicted action label, the illustrative embodiments operate to model the conditional probability $p(X_n|y_v, X_v)$. However, modeling this probability via a generative model directly cannot scale to a large number of objects with diverse visual appearance representation. Instead, the mechanisms of the illustrative embodiments generate the new noun representation $X_n'$ (which may comprise one or more objects present in the video X) via sampling from an object feature bank $O_s$, which is a collection of object features extracted from a batch of videos. The term object "features" refers to the high level dimensional vector representation extracted from the 3D convolutional neural network computer model(s) to which region of interest pooling over the feature map output by the 3D convolutional neural network computer model(s) is applied. This approach makes the searching space for $X_n'$ from infinite to finite, which is more tractable. To decide which objects (which may be one or more objects) participate in composing the noun features $X_n'$, the probability $p(X_n|y_v, X_v)$ is transformed into a production of the action classifier output and a prior distribution via an application of the Bayes rule:

$$\mathrm{argmax}_{X_n}p(X_n|y_v,X_v)=\mathrm{argmax}_{X_n}p(y_v|X_n,X_v)p(X_n|X_v) \quad (2)$$

where $p(y_v|X_n, X_v)$ is the prediction of the action classifier, i.e., the confidence score of the new action-object or verb-noun combination $(X_v, X_n')$ being recognized, to the action type $y_v$ (predicted action label for the action being recognized), and $p(X_n|X_v)$ is the prior (correlation) distribution of features describing the possibility measure for the action to be performed in conjunction with the object, i.e., an expression of the relationship between objects and actions that interact with those objects. Since the noun feature is constructed via sampling and is composed from existing object features, e.g., object features in a batch of videos with the object features being summed, averaged, or the like, across one or more objects to generate $X_n$, the term $p(X_n|X_v)$ can be rewritten as:

$$p(X_n|X_v) \triangleq \Pi_{i=1}^{M} p(o_i|X_v), o_i \in O_s \quad (3)$$

where $o_i$ is the object feature from the object feature bank $O_S$ and M is the number of objects being sampled to compose the noun feature $X_n'$. The object features may be for a single object or multiple objects depending on the context and actions (verbs) being considered. For example, in practice, for an action like [tear sth.] (where sth. stands for "something"), the sampling may be performed with regard to a single object. However, there are other actions that are performed on multiple objects, such as [pour sth. onto sth.], where the sampling may be performed with regard to more than one object. Thus, for purposes of this description, the object features may be considered to be associated with one or more objects. When equation (3) is substituted into equation (2), the composition generation criterion can be written as follows:

$$\operatorname{argmax}_{X_n} p(X_n|y_v, X_v) = \operatorname{argmax}_{X_n} p(y_v|X_n, X_v) \prod_{i=1}^{M} p(o_i|X_v) \quad (4)$$

Based on equation (4) the composition inference consists of two components $p(O|X_v)$ and $p(y_v|X_n, X_v)$. The first component $p(O|X_v)$ determines how objects are sampled to compose the noun representation $X_n$, and the second component $p(y_v|X_n, X_v)$ is the confidence score of the pseudo composition inference. In one illustrative embodiment, the composition interference may be obtained by randomly sampling object features from the object feature bank $O_S$ to construct several pseudo compositions. K candidate object (noun) features are obtained at this stage each of which are combined with the verb feature $X_v$ to thereby generate K pseudo combinations or compositions.

For example, for an input video X with an action [Tear paper], which is referred to herein as an "original combination" of a verb (action) [Tear] and an original noun (object) [Paper], to generate pseudo composition instances, the illustrative embodiments may sample one object (e.g., [CLOTH]) from the object feature bank once, and combine it with the original object [Paper], such as by mixing or combining the original object feature ([Paper]) with the unseen object feature ([Cloth]). It should be appreciated that the verbs (actions) and nouns (objects) are represented by data structures, such as vector data structures, such that the data structures may be mixed or combined in any suitable fashion, such as by summing, averaging, taking a largest value, taking a smallest value, or any other methodology for combining data values representative of object features. For each video, multiple such candidate compositions may be generated. Thus the final results, for example, may comprise separate pseudo composition instances of [Tear paper+cloth] and [Tear paper+leaf], instead of [Tear paper+cloth+leaf]. Hence, K candidate object features are generated and K pseudo combinations or compositions are generated as the verb representation combined with the composition of the sampled object features mixed with the original object features.

Subsequently, these pseudo composition instances are input to an action classifier to get their predicted confidence scores $p(y_v|X_n', X_v)$ and the pseudo composition with the highest predicted confidence score is selected as the composition inference result. That is the object (noun) feature that maximizes the values of equation (3) is selected as the generated noun feature $X_n'$. This selected pseudo composition is then leveraged to train the ML action recognition computer model by adding the newly generated noun feature $X_n'$ along with the corresponding verb feature to the training data and associating the action label with this new instance of training data as a ground truth action label for training the ML action recognition computer model.

It should be appreciated that the random sampling embodiment described above is only one way to select object features from the object feature bank OS for generation of pseudo combinations or compositions. Such random sampling does not take into consideration the relationship between actions and objects, such as certain actions not being performed with certain types of objects, which may lead to samples with objects for actions that are not feasible, e.g., one would not generally "tear" a "bowling ball". To alleviate this issue, in other illustrative embodiments, a co-occurrence composition inference is utilized to estimate the prior (correlation) $p(O|X_v)$ which leverages the co-occurrence based on the statistics between objects and actions in the training dataset.

Formally, this is modeled by a co-occurrence matrix $C \in R^{N_o \times N_a}$, where $N_o$ is the number of object categories, and $N_a$ is the number of action categories. Each entry $c_{ij}$ in C represents the frequency that object category i occurs in action class j in the dataset. The entry values of the co-occurrence matrix are normalized into [0, 1] along the column dimension. Therefore, each entry value represents the likelihood that the action can be performed on the corresponding object. It should be noted that these co-occurrence statistics are constructed based on seen combinations, i.e., combinations in the training dataset. However, with the illustrative embodiments, the likelihood values for unseen combinations are also needed during the training stage of the ML action recognition computer model. The need for predicting the likelihood values of unseen verb-noun (action-object) combinations is a matrix completion task. The illustrative embodiments input the seen co-occurrence matrix C into a graph auto-encoder (GAE) model that encodes the on-hot representation of object and actin categories into a shared latent space. The embedding weights are learned by reconstructing the observed entry values in C. Thus, the predicted likelihood is obtained by decoding the embedding vectors of each action-object pair to thereby generate an estimated co-occurrence matrix C' that includes predictions of likelihoods of unseen combinations of action-objects in addition to the seen action-objects. A predetermined number of the highest likelihood unseen combinations of action-objects may then be selected for use in generating pseudo compositions.

FIG. 1 is an example diagram illustrating the generation of an estimated co-occurrence matrix C' for action (verb) and object (noun) combinations in accordance with one illustrative embodiment. FIG. 1 shows a comparison of a random approach and a co-occurrence composition inference approach to generating this estimated co-occurrence matrix C'. As shown in FIG. 1, various combinations of action-object are present in the training dataset 110 including (put tissue), (put card), (throw bottle), etc. Some combinations 112, 114 are not present but should be included to improve the training of ML action recognition computer model, such as (tear tissue) and (put bread). Using a random sampling approach, it is possible that these combinations may be randomly selected for generating an inferred combination using the mechanisms of the illustrative embodiments. However, as shown in the co-occurrence matrix 120, some combinations may not be included, e.g., 112 is not included in 120, while other combinations, e.g., (tear bottle) 122, which are unlikely, may be included. Using a composition inference approach, however, reasonable combinations are included in the inferred combinations 130, e.g., (tear tissue), (squeeze tissue), (tear card), and (put bread).

As shown in FIG. 1, using a random approach, it is possible that some combinations are not represented in the inferred combinations, e.g., (tear tissue) and thus, will not be able to be accurately recognized in the prediction operation 140. For example, as shown in FIG. 1, in the prediction operation 140, the ML action recognition computer model, trained using randomly selected inferred compositions, can recognize the action in an image showing "put bread" as put something (sth.), but will inaccurately predict that an image showing "tear tissue" involves the action of "hold", i.e., as hold something (sth.). Using a composition inference approach, both the put bread and tear tissue images can be accurately identified as involving the actions "put" and "tear", respectively, as reasonable inferred compositions are represented int eh training datasets while non-reasonable inferred compositions are not.

With regard to the generation of the unseen combinations of action-object pseudo compositions, e.g., generating the noun feature $X_n'$ based on equation (4) above, and based on the estimated co-occurrence matrix C', object features are sampled from the object feature bank $O_s$. This estimated co-occurrence matrix C' provides estimated correlations between action and object pairings. Higher scores in the co-occurrence matrix C' mean that the action and object pairing is relative more probable or possible than other action and object pairings in the co-occurrence matrix C'. These scores are normalized and unseen action-object pairings are sampled based on these scores.

Since these object features are extracted from videos by applying region of interest pooling over a 3D feature map such that objects in a batch of videos are used to construct the feature bank, the corresponding motion information is also encoded into the object representations in the object feature bank $O_s$. If these object features are directly combined with the verb feature $X_v$ to recognize the action corresponding to the video X, the action classifier may be confused by the object features. Thus, the sampled object features from the object feature bank $O_s$ are mixed with the original noun (object) feature of video X as the generated noun (object) feature. In addition, the action labels where the sampled objects came from may be used to provide the video X action labels. This may be represented as follows:

$$X_n' = \lambda X_n + (1-\lambda)\frac{1}{|M|}\sum_{i=1}^{M} o_i \quad (5)$$

$$y_v' = \lambda y_v + (1-\lambda)\frac{1}{|M|}\sum_{i=1}^{M} y_v^{o_i} \quad (6)$$

Here, $o_i \sim p(o|X_v)$ and $y_v^{o_i}$ are one-hot vectors denoting the action label of the video sample from which the object $o_i$ comes. The term $\lambda$ is sampled from a Beta distribution to control he mixture strength between the original noun (object) feature and the sampled object features. K noun features are constructed for each video sample X, i.e., K candidate combinations are sampled via the estimated action-object correlations, such as in the co-occurrence matrix C' and these K candidates are input to the action classifier to obtain a likelihood score indicating a likelihood that the verb (action) can reasonably be performed in conjunction with the noun (object). A predetermined number of the highest scoring combinations may be selected for inclusion as pseudo compositions. That is, each candidate noun feature is combined with the verb feature, such as through concatenation, to generate a pseudo verb-noun composition and input the pseudo verb-noun (action-object) to the action classifier. The candidate noun feature that maximizes equation (4) above is selected as the noun feature $X_n'$ for a video sample X. The pseudo composition $(X_v, X_n')$ is input to the action classifier to obtain a prediction and compute a loss value with the soft label which a highest scoring composition be selected for including in the training data for training the ML action recognition computer model. The loss for the generated pseudo composition can be written as follows:

$$\mathcal{L}_{pseudo} = \text{CrossEntropy}(p(y_v|X_n',X_v),y_v') \quad (7)$$

The machine learning training of the action classifier, i.e., the ML action recognition computer model, operates to iteratively adjust operational parameters of the ML action recognition computer model (action classifier) to reduce this loss until a convergence condition is achieved, e.g., the loss is less than a predetermined threshold amount, a number of iterations have been performed, all of the training data has been processed, or any other suitable convergence condition. It should be appreciated that, as discussed hereafter, this loss may be combined with other loss measurements to get a combined loss from various sources and the machine learning may adjust the ML action recognition computer model's operational parameters based on the combined loss. In this way, the ML action recognition computer model is trained to more accurately recognize the given action $X_v$ in video/image data with seen and unseen objects.

In accordance with one illustrative embodiment, this process of training the ML action recognition computer model based on the pseudo compositions may be represented as an algorithm in pseudocode as follows:

---
Algorithm: Pseudo Composition Inference
---
Input: A batch of video/image data B, the estimated prior $P(O|X_v)$
 1: Construct the object feature bank $O_s$ from B
 2: for video X in B do
 3:   for t = 1, . . . ,K do
 4:     Sample M object features via equation (3)
 5:     Compose candidate noun feature $X_N'$ and its soft label $y_v'$ via equations (5)(6)
 6:   end for
 7:   Infer the pseudo verb-noun composition via equation (4)
 8:   Update the network via equation (7)
 9: end for
Output: The ML action recognition model trained with pseudo compositions

---

With the above algorithm in mind, it can be seen that for each video X in a batch of videos B, K candidates of action-object combinations are constructed from which the new noun feature $X_n'$ is constructed. Each candidate contains M object features sampled from the feature bank Os according to the estimated prior (correlation). Instead of directly sending each candidate noun feature along with the verb feature into the action classifier, a manifold mix-up is employed for the candidate noun feature and the original noun feature (noun feature for object actually present in the original video content) which is then input into the action classifier. Again, as noted above, the reason for using the mix-up of the candidate noun features and the original noun feature is that the extracted object features contain the knowledge about actions present in the given video X, and thus totally discarding the original noun features will lead the action classifier to not predict reasonable scores from the composed noun feature. Each candidate $X_n'$ is input into the action classifier along with the verb feature $X_v$ to generate a prediction score of action $y_v$. The candidate $X_n'$ with maximal confidence score (see equation (4)), is selected as the generated new noun feature for the video sample X which is then used to update the action classifier's training based on equation (7).

Figure 2:
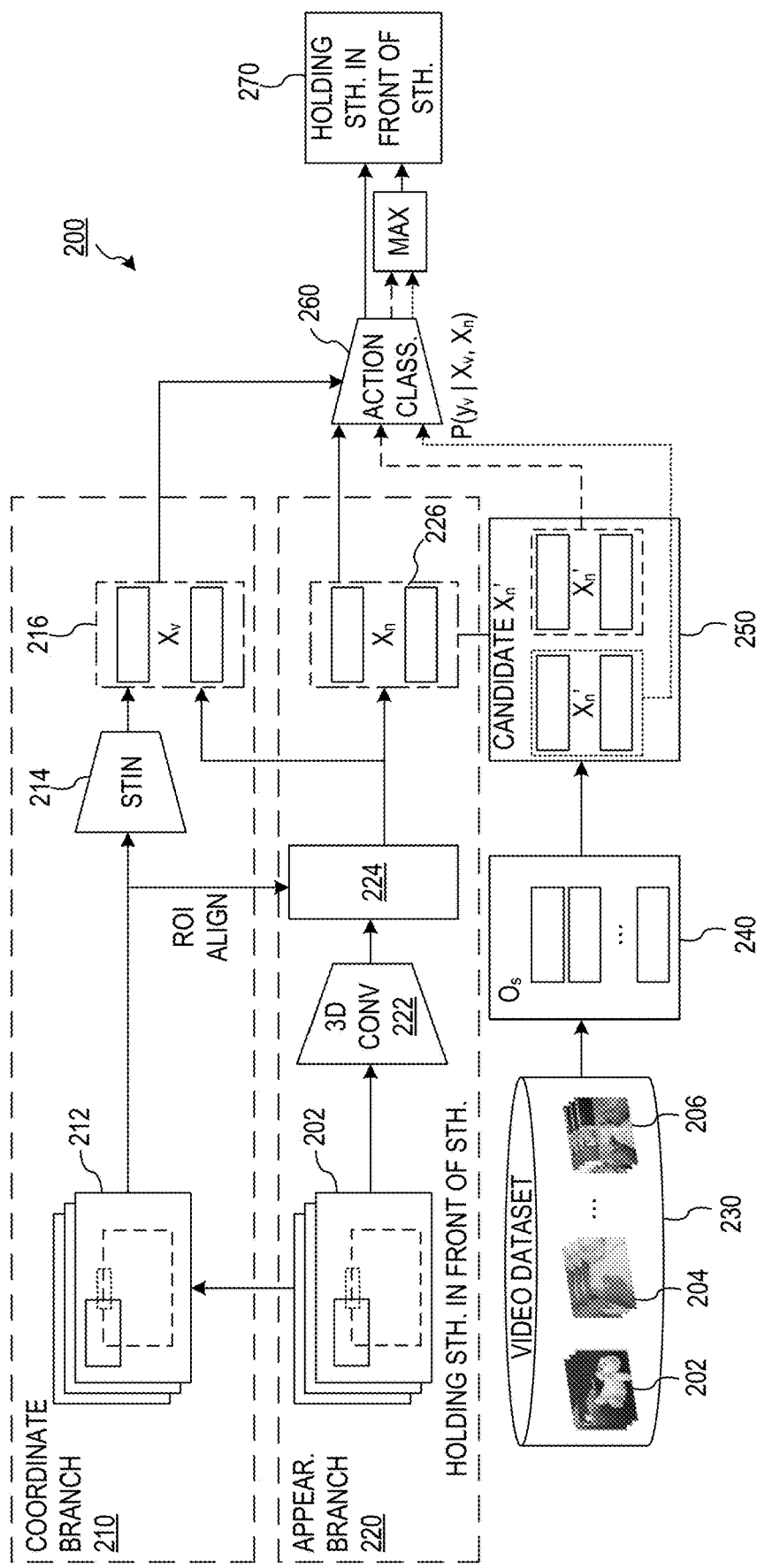
FIG. 2 is an example block diagram of the primary operational components of a pseudo composition inference (PCI) network framework in accordance with one illustrative embodiment.

FIG. 2 is an example block diagram of the primary operational components of a pseudo composition inference (PCI) network framework in accordance with one illustrative embodiment. The input data 202 to the PCI network (PCINet) framework 200 includes input data of two modalities: Red-Green-Blue (RGB) frames and instance box coordinates. A first machine learning computer model 214 operates on the instance box coordinate data to extract motion features extracted while a second machine learning computer model 222 operates on the RGB frames to extract the appearance features from the input data 202. These features are grouped into the verb representations 216 and noun representations 226.

It should be appreciated that the first and second machine learning computer models 214, 222 may be any suitable type of machine learning computer model that is trained to operate on input features from image input data 202 and perform their corresponding operations to extract verb (action) features 216 and noun (object) features 226, respectively. For example, these machine learning computer models may be any type of machine learning trained neural networks, convolutional neural networks, deep learning neural networks, or the like. Moreover, the first and second machine learning computer models 214, 222 need not be the same type of machine learning computer model, and each may comprise one or more machine learning computer models. For example, in one illustrative embodiment, the first machine learning computer model 214 may be a spatial-temporal interaction network (STIN) (see Materzynska et al., previously mentioned above) that has been modified to operate on relative displacement input rather than absolute box coordinates, as discussed hereafter, while the second machine learning computer model 222 may be a three dimensional (3D) convolutional neural network (ConvNet) that operates on RGB frames to extract noun (object) representations. The extracted representations may be provided as vectors of feature values.

The multi-modal information may be combined for training the action classifier 260 using seen and unseen (pseudo) compositions, e.g., $(X_v, X_n)$ and $(X_v, X_n')$. A late fusion strategy may be used to combine these two modalities of information in the verb (action) representation 216 and the noun (object) representation 226. The fused representations may be input to the action classifier 260 along with pseudo compositions based on candidate $X_n'$ 250 generated from the object feature bank $O_s$ 240, as generated from the video dataset 250 of seen objects.

For example, as shown in FIG. 2, the PCI network framework 200 utilizes a multi-branch network framework to capture multi-level information from an input video 202. The multi-branch network framework 200 comprises a coordinates branch 210 to capture the motion (verb or action) features of actions based on bounding box coordinates extracted from the input video 202 and models the relative position changes of objects in the input video 202 over time. Since this dynamic representation is object-agnostic, the dynamic representation is treated as part of the verb (action) representation. The capturing of motion features and bounding box features may be performed using any known or later developed technologies for capturing such features, such as those for compositional action recognition with spatial temporal interaction networks (STIN). While a modified STIN will be used as an example herein, the illustrative embodiments are not limited to such and any motion and bounding box feature extraction mechanism may be used without departing from the spirit and scope of the present invention.

The coordinates branch 210 takes the bounding box coordinates sequence as the input data into the first machine learning computer model 214 which operates on this bounding box coordinates sequence to extract and output a feature vector $X_v$ to represent the movement (verb or action) representation of the action depicted in the input video 202 data. As mentioned above, the first machine learning computer model 214 may be a modified STIN that has been modified to process the bounding box coordinates input by representing each bounding box for each object in the input video data 202 as its relative displacement with other objects at each frame instead of the absolute box coordinates as its representation. That is, where STIN may utilize a quadruple (x, y, h, w) as input, the modified STIN according to the illustrative embodiments instead utilize a displacement between instances, such as (dx, dy, dw, dh), which specifies the relative movement describing the dynamic motion between instances whereas the original STIN input (x, y, h, w) fails to describe such relative movement. In this way, the influence of the size and the initial positions of the bounding boxes is reduced, which provides an improved representation of the relative movement between the subjects and objects in the video.

The multi-branch network framework 200 further includes an appearance branch 220 to extract appearance information for objects present in the input video 202. As noted above, in some illustrative embodiments, the input video 202 data is processed by one or more 3D ConvNets, e.g., I3D, SlowFast, or the like, to extract the spatio-temporal feature map of RGB frames. With the guidance of the object instance bounding boxes again, region of interest (RoI) features are extracted for objects and subjects at each frame and employ average pooling on both spatial and temporal dimension to get the feature vector for each object instance in the input video 202 data. The subject appearance features (e.g., the human hand performing the action) are regarded as part of the verb (action) representation by the motion detection model, e.g., the modified STIN model, meaning that only object appearance features contribute to compose the noun (object) representation.

Based on the extracted multi-modal information, features are grouped into the noun representations $X_n$ 226 and verb representations $X_v$ 216 of the input video 202 data. The verb representation contains the movement feature output by the coordinate branch 210 and the subject RoI feature from the appearance branch 220. The noun representation $X_n$ 226 is the average of the RoI features of the objects involved in the action represented by the verb representation $X_v$ 216. Thus, through operation of the coordinates branch 210, the verb (action) representation $X_v$ 216 for actions present in the input video 202 are obtained. Through operation of the appearance branch 220, the noun (object) representation $X_n$ 226 for the objects present in the input video 202 are obtained, as well as some verb representations that are encoded in the object representation, as previously discussed above.

In one illustrative embodiment, to fuse the multi-modal features of the verb and noun representations 216, 226, all instance appearance features $X_n$ 226 are averaged, summed or otherwise combined, and then this average, sum or other combination of appearance features is concatenated with the coordinates motion feature, i.e., the verb (action) representation 216 to generate a fused feature input. The fused feature input is fed into the action classifier which operates on the fused feature input (while FIG. 2 shows the verb and object features separately for illustration purposes, it should be appreciated that these features may be combined into a fused feature input) to get the prediction and compute the cross-entropy loss $\mathcal{L}\, f_{use}$. This cross-entropy loss may be combined with the losses $\mathcal{L}_{rgb}$ and $\mathcal{L}_{coord}$ for the first and second machine learning computer models 214 and 222 to increase the speed of convergence of the fusion process, and may be further combined with the pseudo composition loss $\mathcal{L}_{pseudo}$ from equation (7) above to generate the overall loss for the PCINet framework 200 which may be used to train the machine learning computer models 214, 222, and the action classifier 260 through a machine learning process that minimizes the overall loss through epochs or iterations of machine learning training operations.

At approximately a same time as the training of the various machine learning computer models 214, 222, and the action classifier 260, the procedure described above with regard to pseudo composition generation using equations (5)-(7) and the corresponding operations is followed to infer the pseudo composition for each input video X 202-206 in the video dataset 230. It should be noted that the input video 202 that is used to train the machine learning computer models 214, 222 and the action classifier 260 is only one of the input video data 202-206 in the video dataset 230, and that the machine learning training may be performed with regard to each input video data 202-206. Moreover, the video data 202-206 in the video dataset 230 may have associated labels or ground truth data that facilitates the calculation of loss values and to determine how to adjust operational parameters of the computer models 214, 222 and action classifier 260 so as to reduce the loss and train the models.

The object RoI features in a batch of videos 202, 204, and 206 are used to construct the object feature bank Os 240 from the video data 202-206 in the video dataset 230 by applying RoI pooling over the 3D feature map. The object feature bank Os 240 is in turn processed to generate candidate object representations $X_n'$ 250 which may be used to generate pseudo compositions for training the action classifier 260. The generation of the unseen combinations, i.e., the action-object pseudo compositions, the noun feature $X_n'$ is generated based on equation (4) above. Based on the estimated co-occurrence matrix C', as described previously, object features are sampled from the object feature bank $O_s$ 240. The sampled object features from the object feature bank $O_s$ 240 are mixed with the original noun (object) feature of the corresponding video X 202, 204, or 206, as the generated noun (object) feature $X_n'$, e.g., such as by performing a sum, average, etc. operation among multiple object features. In addition, the action labels where the sampled objects came from are combined with video X's action label.

Subsequently, each candidate noun feature $X_n'$ 250 is combined with the verb (action) feature for that input video 202, 204, 206 data as the generated pseudo verb-noun composition ($X_v$, $X_n'$) and input to the action classifier 260. The candidate noun feature that maximizes equation (4) above is selected as the noun feature $X_n'$ for a video sample X 202, 204, 206. The pseudo composition ($X_v$, $X_n'$) is input to the action classifier 260 to obtain a prediction and compute a loss value $\mathcal{L}_{pseudo}$ (see equation (7) above) with the soft label $y_v'$.

The inferred pseudo composition for video X 202, 204, 206 is used to update the network, e.g., the training of the 3D convolutional neural network the action classifier, etc., based on the loss $\mathcal{L}_{pseudo}$ The machine learning training of the action classifier 260, i.e., the ML action recognition computer model, operates to iteratively adjust operational parameters of the ML action recognition computer model (action classifier) 260 to reduce this loss $\mathcal{L}_{pseudo}$ until a convergence condition is achieved, e.g., the loss is less than a predetermined threshold amount, a number of iterations or epochs have been performed, all of the training data has been processed, or any other suitable convergence condition.

This loss may be combined with other loss measurements to get a combined loss from various sources and the machine learning may adjust the ML action recognition computer model's operational parameters based on the combined loss.

The final training loss of the PCINet framework 200 is a summation of each individual part, which can be written as:

$$\mathcal{L} = \mathcal{L}_{pseudo} + \alpha(\mathcal{L}_{fuse} + \mathcal{L}_{rgb} + \mathcal{L}_{coord}) \quad (8)$$

where α is a trade-off parameter to balance the loss on the pseudo composition $\mathcal{L}_{pseudo}$ and the loss on the original combination of the original noun (object) and verb (action) in video X 202. By training the ML action recognition computer model (action classifier) 260 using not only seen combinations of actions-objects, but also unseen combinations, i.e., pseudo compositions, the ML action recognition computer model (action classifier) 260 is trained to more accurately recognize the given action $X_v$ in video/image data even when presented with video input data comprising novel or previously unseen objects.

It should be appreciated that after training of the ML action recognition computer model (action classifier) 260, the generation of pseudo compositions is no longer necessary. Rather, during testing stage and/or inference (runtime) operation, the elements 230-250 and the input of candidate noun (object) representations Xn' into the action classifier is no longer performed. Instead, during testing or inference time operation, the PCINet framework 200 uses only the verb-noun (action-object) combination from each new input video data (not shown), as generated by the two branches 210, 220 combining $X_v$ and $X_n$, to recognize the action classification for the new input video. Solid lines connecting components in the figure represent the flow of data during training and inference operations, whereas dashed lines are for training only. The "max" referenced as the second output in FIG. 2 refers to a softmax function used during training to perform the machine learning operations based on the loss calculations.

The Pseudo Composition Inference (PCI) network (PCINet) framework 200 and the PCI approach of the illustrative embodiments make it possible to train a machine learning action recognition computer model, or action classifier 260, using machine learning processes based on inferred unseen, but plausible, compositions. The plausibility of these compositions is enforced by the selection of candidates 250 from the object feature bank $O_s$ 240 based on estimated co-occurrence matrix C' that provides scoring of candidate combinations of actions Xv with objects Xn' that may be selected randomly or with composition inference based selection. The ML action recognition computer model 260 utilizes these pseudo compositions to learn more complementary information about unseen objects for action verbs. The composition inference criterion considers both the action-object co-occurrence prior and the confidence score of each candidate pseudo composition. The resulting PCINet framework 200 has been determined to outperform existing methods and architectures with regard to new or novel action-object combinations present in input video data.

The illustrative embodiments are specifically directed to improving the machine learning training of an artificial intelligence computer model, and specifically an artificial intelligence computer model specifically configured to perform action recognition in video/image data input to the computer model. The illustrative embodiments are specifically directed to generating pseudo compositions representing novel and previously unseen combinations of actions-objects that are not represented in the original labeled training dataset, e.g., 230 in FIG. 2. In this way, the training of the machine learning computer model, e.g., action classifier 260, is improved by improving the training dataset used to train the machine learning computer model to include previously unseen combinations. The improvements are specifically generated by combining feature representations of objects with feature representations of verbs (actions) detected through image recognition operations as being present in the input video/image data. In some illustrative embodiments, the pseudo compositions are generating using an estimated co-occurrence matrix which enforces that the pseudo compositions include only those compositions that are reasonable and feasible.

Figure 3:
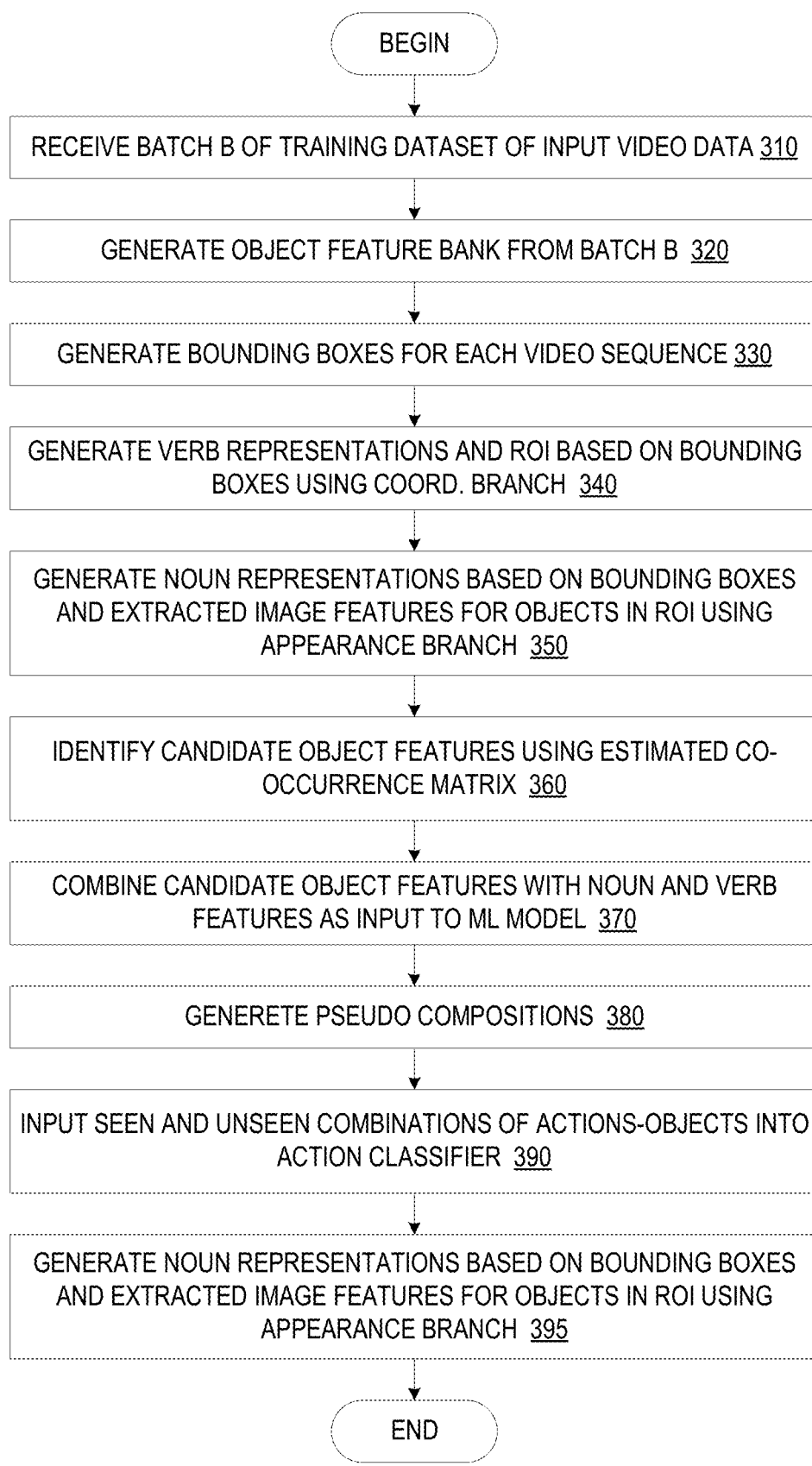
FIG. 3 is a flowchart outlining an example operation of a PCI network architecture in training a machine learning action recognition computer model (action classifier) in accordance with one illustrative embodiment.

FIG. 3 is a flowchart outlining an example operation of a PCI network architecture in training a machine learning action recognition computer model (action classifier) in accordance with one illustrative embodiment. The operation shown in FIG. 3 may be performed, for example, by the PCINet framework 200 in FIG. 2, with individual operations of FIG. 3 being performed by different elements of the framework 200 in accordance with one or more of the illustrative embodiments described above. It should be appreciated that the operations outlined in FIG. 3 are specifically performed automatically by an improved computer tool of the illustrative embodiments and are not intended to be, and cannot practically be, performed by human beings either as mental processes or by organizing human activity. To the contrary, even if human beings were to initiate the performance of the operations set forth in FIG. 3 or make use of the results generated as a consequence of the operations set forth in FIG. 3, the operations in FIG. 3 themselves are specifically performed by the improved computing tool in an automated manner.

As shown in FIG. 3, the operation starts by receiving a batch B of training dataset of input video data representing actions and objects (step 310). The batch B may comprise a plurality of different input video sequences, each video sequence comprising a plurality of video frames of data depicting one or more objects and corresponding action(s) performed with regard to these one or more objects, e.g., tearing paper. An object feature bank $O_s$ is generated from the batch B of input video/image data (step 320). For each video sequence in the input video data, bounding boxes are generated for objects present in frames of the video/image data (step 330) and corresponding verb representations $X_v$ and region of interest (RoI) are generated based on the bounding boxes using a coordinates branch of the framework (step 340). In addition, noun representations $X_n$ are generated based on the bounding boxes and extracted image features, e.g., RGB feature extraction, for the objects in the RoI using an appearance branch of the framework (step 350).

From the object feature bank $O_s$, candidate object features are identified using an estimated co-occurrence matrix C' and sampling of the co-occurrence matrix C' (step 360). The candidate object features $X_n'$ are combined with the noun (object) features $X_n$ and verb (action) features $X_v$ as input to the machine learning action recognition computer model (action classifier) (step 370). The candidate object features $X_n'$ are combined with the verb features $X_v$ to generate pseudo compositions ($X_v$, $X_n'$) (step 380). Both the seen combinations ($X_v$, $X_n$) and generated pseudo compositions ($X_v$, $X_n'$) are input to the action classifier to generate predicted action classification outputs (step 390). The predicted action classifications are compared to ground truth labels to determine a loss which is then used to train the action classifier and/or the other computer models in the framework (step 395). As noted above, the training may involve many iterations or epochs of training in which different combinations and pseudo compositions are input to the action classifier and the operational parameters adjusted based on the loss calculation to thereby reduce loss and converge the training of the action classifier to an optimal configuration. The operation then terminates.

Figure 4:
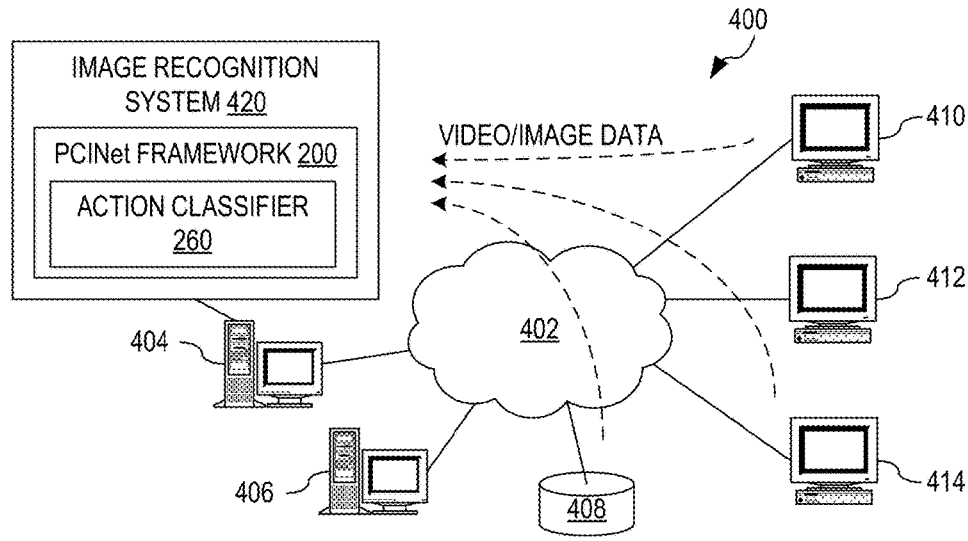
FIG. 4 is an example diagram of a distributed data processing system in which aspects of the illustrative embodiments may be implemented.
Figure 5:
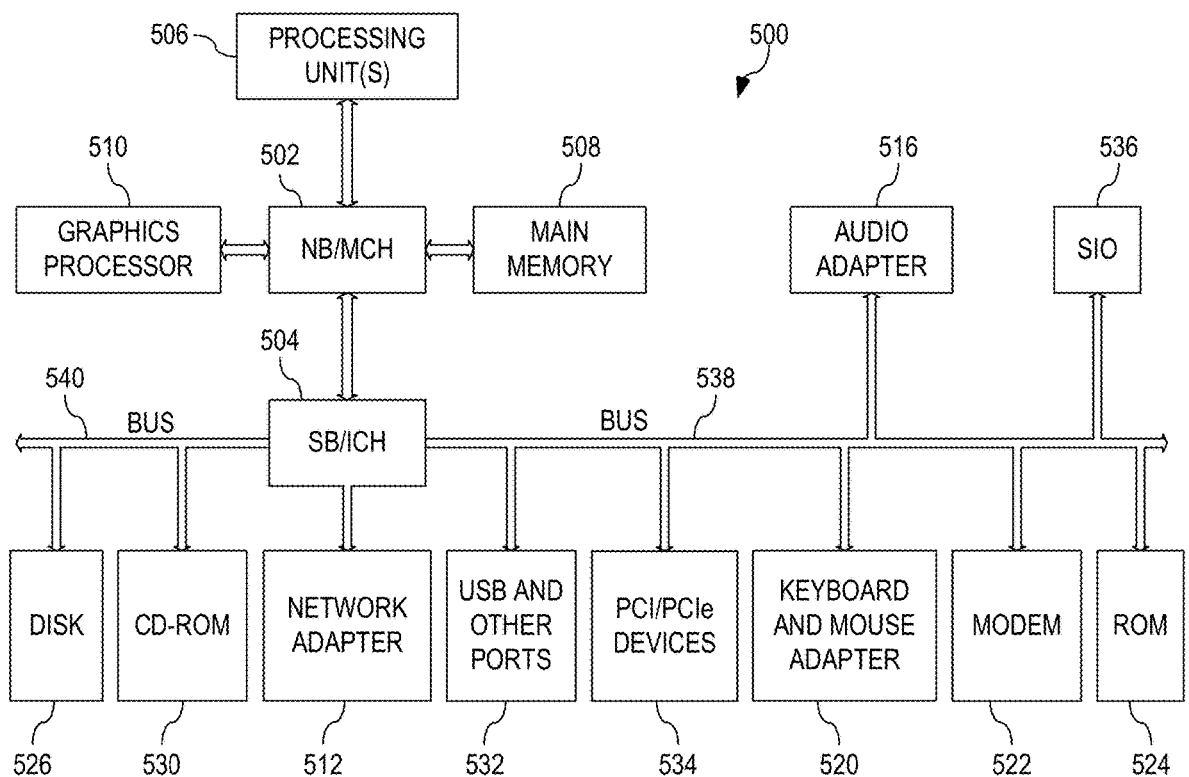
FIG. 5 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 4 and 5 are provided hereafter as example environments in which aspects of the illustrative embodiments may be implemented. It should be appreciated that FIGS. 4 and 5 are only examples and are not intended to assert or imply any limitation with regard to the environments in which aspects or embodiments of the present invention may be implemented. Many modifications to the depicted environments may be made without departing from the spirit and scope of the present invention.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, server 404 and server 406 are connected to network 402 along with storage unit 408. In addition, clients 410, 412, and 414 are also connected to network 402. These clients 410, 412, and 414 may be, for example, personal computers, network computers, or the like. In the depicted example, server 404 provides data, such as boot files, operating system images, and applications to the clients 410, 412, and 414. Clients 410, 412, and 414 are clients to server 404 in the depicted example. Distributed data processing system 400 may include additional servers, clients, and other devices not shown.

In the depicted example, distributed data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

As shown in FIG. 4, one or more of the computing devices, e.g., server 404, may be specifically configured to implement a PCINet framework 200 for training a machine learning action recognition computer model 260. The PCINet framework 200 and computer model 260 may be part of an overall image processing computer system 420 that operates to process input video/image data from client computing devices 410-414, network attached storage 408, server 406, or the like, to perform various operations, which includes action recognition. The one or more computing devices may perform additional image recognition operations and/or downstream processing of video/image data based on the action recognition performed by the machine learning action recognition computer model trained by the mechanisms of the illustrative embodiments based on the pseudo compositions. Any artificial intelligence based operations that operate based on recognized actions in video/image data are intended to be within the spirit and scope of the present invention.

The configuring of the one or more computing devices may comprise the providing of application specific hardware, firmware, or the like to facilitate the performance of the operations and generation of the outputs described herein with regard to the illustrative embodiments. The configuring of the one or more computing devices may also, or alternatively, comprise the providing of software applications stored in one or more storage devices and loaded into memory of the one or more computing devices, such as server 404, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates improved machine learning training of a machine learning action recognition computer model of an artificial intelligence based image recognition computing system.

As noted above, the mechanisms of the illustrative embodiments utilize specifically configured computing devices, or data processing systems, to perform the operations for machine learning training of a machine learning recognition computer model based on pseudo compositions of unseen action-object combinations. These computing devices, or data processing systems, may comprise various hardware elements which are specifically configured, either through hardware configuration, software configuration, or a combination of hardware and software configuration, to implement one or more of the systems/subsystems described herein. FIG. 5 is a block diagram of just one example data processing system in which aspects of the illustrative embodiments may be implemented. Data processing system 500 is an example of a computer, such as server 404 in FIG. 4, in which computer usable code or instructions implementing the processes and aspects of the illustrative embodiments of the present invention may be located and/or executed so as to achieve the operation, output, and external effects of the illustrative embodiments as described herein.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM eServer™ System p® computer system, Power™ processor based computer system, or the like, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

As mentioned above, in some illustrative embodiments the mechanisms of the illustrative embodiments may be implemented as application specific hardware, firmware, or the like, application software stored in a storage device, such as HDD 526 and loaded into memory, such as main memory 508, for executed by one or more hardware processors, such as processing unit 506, or the like. As such, the computing device shown in FIG. 5 becomes specifically configured to implement the mechanisms of the illustrative embodiments and specifically configured to perform the operations and generate the outputs described herein with regard to the machine learning training of a machine learning recognition computer model based on pseudo compositions of unseen action-object combinations.

Those of ordinary skill in the art will appreciate that the hardware in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing machine learning training of a machine learning (ML) action recognition computer model executing in at least one computing device, the computer-implemented method comprising:

processing an original input dataset, comprising a plurality of data structures each representing a corresponding video sequence, to generate an object feature bank comprising object feature data structures for a plurality of objects;

generating, for a first video sequence in the original input dataset, a verb data structure and an original object data structure;

selecting, from the object feature bank, a candidate object feature data structure for generation of pseudo composition training data, wherein the selecting comprises selecting the candidate object feature data structure based on a co-occurrence matrix corresponding to the original object data structure, the co-occurrence matrix comprises estimated correlations between an action and a first object, and is generated by processing the original input dataset, and the candidate object feature data structure is for a second object of the plurality of objects, which in combination with the action corresponding to the verb data structure, is determined to be a combination that has a likelihood measure of being represented in new input data;

generating the pseudo composition training data as the new input data based on the selected candidate object feature data structure and the verb data structure, wherein the pseudo composition training data comprises a combination of the verb data structure and the candidate object feature data structure, and the pseudo composition training data represents a combination of the action and the second object not represented in the original input dataset, and the generating of the pseudo composition training data comprises using a trained feature extraction model to produce feature embeddings for the selected candidate object feature data structure, and combining the feature embeddings with the verb data structure in a digital data structure for input to the ML action recognition computer model;

training the ML action recognition computer model based on both seen combinations comprising the verb data structure combined with the original object data structure, and an unseen combination comprising the pseudo composition training data; and performing, by the trained ML action recognition computer model, an action recognition for compositional actions in a second video sequence, wherein the performing comprises:

processing the second video sequence to extract a corresponding verb data structure and a corresponding object feature data structure;

matching the extracted corresponding verb data structure and the corresponding object feature data structure with features of both the seen combinations and the unseen combination stored in the trained ML action recognition computer model; and generating an action recognition output based on the matching.

2. The computer-implemented method of claim 1, wherein the generating of the pseudo composition training data further comprises associating a correct action label with the pseudo composition training data, the correct action label specifying a correct action prediction to be generated by the ML action recognition computer model, and the ML action recognition computer model, is trained through a machine learning training operation, to generate the correct action label as a predicted action of the ML action recognition computer model, based on the ML action recognition computer model receiving the pseudo composition training data as input.

3. The computer-implemented method of claim 1, wherein the generating of the pseudo composition training data comprises mixing the candidate object feature data structure with original object feature data structure to generate a mixed object feature data structure that is combined with the verb data structure.

4. The computer-implemented method of claim 1, wherein the selecting of the candidate object feature data structure for the generation of the pseudo composition training data further comprises selecting a plurality of candidate object feature data structures based on the co-occurrence matrix corresponding to the original object data structure, the generating of the pseudo composition training data comprises generating, for each candidate object feature data structure in the plurality of candidate object feature data structures, a separate pseudo composition instance in the pseudo composition training data of the verb data structure in combination with a mixture of the original object data structure and the candidate object feature data structure, and the pseudo composition training data comprises a plurality of pseudo composition instances.

5. The computer-implemented method of claim 4, further comprising:

processing, by an action classifier, each pseudo composition instance, of the plurality of pseudo composition instances, in the pseudo composition training data to generate a confidence score, of a plurality of confidence scores, for each pseudo composition instance;

selecting a pseudo composition instance, of the plurality of pseudo composition instances, having a highest confidence score among the plurality of confidence scores generated for the plurality of pseudo composition instances; and adding the selected pseudo composition instance to the pseudo composition training data used to train the ML action recognition computer model.

6. The computer-implemented method of claim 1, wherein the original input dataset comprises a plurality of video sequences, each video sequence, of the plurality of video sequences, is batch of video content, and each batch of video content corresponds to a different original action and original object pairing.

7. The computer-implemented method of claim 1, wherein the selecting, from the object feature bank, of the candidate object feature data structure for the generation of the pseudo composition training data further comprises randomly selecting the object feature data structures from the object feature bank.

8. The computer-implemented method of claim 1, wherein the selecting, from the object feature bank, the candidate object feature data structure for the generation of the pseudo composition training data comprises:

performing a co-occurrence analysis of the plurality of objects represented by the object feature data structures in the object feature bank to select at least one object, of the plurality of objects, having a relatively highest co-occurrence score as an object whose object feature data structure is used to generate the pseudo composition training data.

9. The computer-implemented method of claim 1, wherein the generating of the verb data structure and the original object data structure comprises processing the first video sequence through a modified spatial temporal interaction network (STIN) that is modified to operate on displacement features as input.

10. A computer program product comprising a computer readable storage medium having a computer readable program stored therein, wherein the computer readable program, when executed on a computing device, causes the computing device to perform machine learning training of a machine learning (ML) action recognition computer model executing in at least one computing device, at least by:

processing an original input dataset, comprising a plurality of data structures each representing a corresponding video sequence, to generate an object feature bank comprising object feature data structures for a plurality of objects;

generating, for a first video sequence in the original input dataset, a verb data structure and an original object data structure;

selecting, from the object feature bank, a candidate object feature data structure for generation of pseudo composition training data, wherein the selecting comprises selecting the candidate object feature data structure based on a co-occurrence matrix corresponding to the original object data structure, the co-occurrence matrix comprises estimated correlations between an action and a first object, and is generated by processing the original input dataset, and the candidate object feature data structure is for a second object of the plurality of objects, which in combination with the action corresponding to the verb data structure, is determined to be a combination that has a likelihood measure of being represented in new input data;

generating the pseudo composition training data as the new input data based on the selected candidate object feature data structure and the verb data structure, wherein the pseudo composition training data comprises a combination of the verb data structure and the candidate object feature data structure, and the pseudo composition training data represents a combination of the action and the second object not represented in the original input dataset, and the generating of the pseudo composition training data comprises using a trained feature extraction model to produce feature embeddings for the selected candidate object feature data structure, and combining the feature embeddings with the verb data structure in a digital data structure for input to the ML action recognition computer model;

training the ML action recognition computer model based on both seen combinations comprising the verb data structure combined with the original object data structure, and an unseen combination comprising the pseudo composition training data; and performing, by the trained ML action recognition computer model, an action recognition for compositional actions in a second video sequence, wherein the performing comprises:

processing the second video sequence to extract a corresponding verb data structure and a corresponding object feature data structure;

matching the extracted corresponding verb data structure and the corresponding object feature data structure with features of both the seen combinations and the unseen combination stored in the trained ML action recognition computer model; and generating an action recognition output based on the matching.

11. The computer program product of claim 10, wherein the generating of the pseudo composition training data further comprises associating a correct action label with the pseudo composition training data, the correct action label specifying a correct action prediction to be generated by the ML action recognition computer model, and the ML action recognition computer model, is trained through a machine learning training operation, to generate the correct action label as a predicted action of the ML action recognition computer model, based on the ML action recognition computer model receiving the pseudo composition training data as input.

12. The computer program product of claim 10, wherein the generating of the pseudo composition training data comprises mixing the candidate object feature data structure with original object feature data structure to generate a mixed object feature data structure that is combined with the verb data structure.

13. The computer program product of claim 10, wherein the selecting of the candidate object feature data structure for the generation of the pseudo composition training data further comprises selecting a plurality of candidate object feature data structures based on the co-occurrence matrix corresponding to the original object data structure, the generating of the pseudo composition training data comprises generating, for each candidate object feature data structure in the plurality of candidate object feature data structures, a separate pseudo composition instance in the pseudo composition training data of the verb data structure in combination with a mixture of the original object data structure and the candidate object feature data structure, and the pseudo composition training data comprises a plurality of pseudo composition instances.

14. The computer program product of claim 13, wherein the computer readable program further causes the computing device to perform the machine learning training of the machine learning (ML) action recognition computer model executing in the at least one computing device, at least by:

processing, by an action classifier, each pseudo composition instance, of the plurality of pseudo composition instances, in the pseudo composition training data to generate a confidence score, of a plurality of confidence scores, for each pseudo composition instance;

selecting a pseudo composition instance, of the plurality of pseudo composition instances, having a highest confidence score among the plurality of confidence scores generated for the plurality of pseudo composition instances; and adding the selected pseudo composition instance to the pseudo composition training data used to train the ML action recognition computer model.

15. The computer program product of claim 10, wherein the original input dataset comprises a plurality of video sequences, each video sequence, of the plurality of video sequences, is a batch of video content, and each batch of video content corresponds to a different original action and original object pairing.

16. The computer program product of claim 10, wherein the selecting, from the object feature bank, the candidate object feature data structure for the generation of the pseudo composition training data further comprises randomly selecting the object feature data structures from the object feature bank.

17. The computer program product of claim 10, wherein the selecting, from the object feature bank, of the candidate object feature data structure for the generation of the pseudo composition training data comprises:

performing a co-occurrence analysis of the plurality of objects represented by the object feature data structures in the object feature bank to select at least one object, of the plurality of objects, having a relatively highest co-occurrence score as an object whose object feature data structure is used to generate the pseudo composition training data.

18. An apparatus, comprising:

at least one processor; and at least one memory coupled to the at least one processor, wherein the at least one memory comprises instructions which, when executed by the at least one processor, cause the at least one processor to perform machine learning training of a machine learning (ML) action recognition computer model executing in at least one computing device, at least by:

processing an original input dataset, comprising a plurality of data structures each representing a corresponding video sequence, to generate an object feature bank comprising object feature data structures for a plurality of objects;

generating, for a first video sequence in the original input dataset, a verb data structure and an original object data structure;

selecting, from the object feature bank, a candidate object feature data structure for generation of pseudo composition training data, wherein
- the selecting comprises selecting the candidate object feature data structure based on a co-occurrence matrix corresponding to the original object data structure,
- the co-occurrence matrix comprises estimated correlations between an action and a first object, and is generated by processing the original input dataset, and
- the candidate object feature data structure is for a second object of the plurality of objects, which in combination with the action corresponding to the verb data structure, is determined to be a combination that has a likelihood measure of being represented in new input data;

generating the pseudo composition training data as the new input data based on the selected candidate object feature data structure and the verb data structure, wherein
- the pseudo composition training data comprises a combination of the verb data structure and the candidate object feature data structure, and
- the pseudo composition training data represents a combination of the action and the second object not represented in the original input dataset, and
- the generating of the pseudo composition training data comprises using a trained feature extraction model to produce feature embeddings for the selected candidate object feature data structure, and combining the feature embeddings with the verb data structure in a digital data structure for input to the ML action recognition computer model;

training the ML action recognition computer model based on both seen combinations comprising the verb data structure combined with the original object data structure, and an unseen combination comprising the pseudo composition training data; and performing, by the trained ML action recognition computer model, an action recognition for compositional actions in a second video sequence, wherein the performing comprises:
- processing the second video sequence to extract a corresponding verb data structure and a corresponding object feature data structure;
- matching the extracted corresponding verb data structure and the corresponding object feature data structure with features of both the seen combinations and the unseen combination stored in the trained ML action recognition computer model; and
- generating an action recognition output based on the matching.

* * * * *